US008125997B1

(12) United States Patent
Greene (10) Patent No.: US 8,125,997 B1
(45) Date of Patent: *Feb. 28, 2012

(54) SYSTEMS AND METHODS FOR PROCESSING ANY-TO-ANY TRANSMISSIONS

(75) Inventor: Spencer Greene, Palo Alto, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 1177 days.

This patent is subject to a terminal disclaimer.

(21) Appl. No.: 11/857,086

(22) Filed: Sep. 18, 2007

Related U.S. Application Data

(63) Continuation of application No. 10/417,196, filed on Apr. 17, 2003, now Pat. No. 7,289,508.

(60) Provisional application No. 60/453,818, filed on Mar. 12, 2003.

(51) Int. Cl.
*H04L 12/28* (2006.01)

(52) U.S. Cl. ......... 370/401; 370/386; 370/392; 370/394

(58) Field of Classification Search .................... None
See application file for complete search history.

(56) References Cited

U.S. PATENT DOCUMENTS

| 5,282,201 | A | | 1/1994 | Frank et al. |
| 5,491,728 | A | * | 2/1996 | Verhille et al. ................ 375/362 |
| 5,898,873 | A | | 4/1999 | Lehr |
| 6,188,686 | B1 | * | 2/2001 | Smith ........................... 370/388 |
| 6,246,684 | B1 | | 6/2001 | Chapman et al. |
| 6,389,419 | B1 | | 5/2002 | Wong et al. |
| 6,477,168 | B1 | | 11/2002 | Delp et al. |
| 6,546,391 | B1 | | 4/2003 | Tsuruoka |
| 6,600,741 | B1 | | 7/2003 | Chrin et al. |
| 6,618,760 | B1 | | 9/2003 | Aramaki et al. |
| 6,747,972 | B1 | | 6/2004 | Lenoski et al. |
| 6,788,686 | B1 | | 9/2004 | Khotimsky et al. |
| 6,816,492 | B1 | | 11/2004 | Turner et al. |
| 6,876,952 | B1 | | 4/2005 | Kappler et al. |
| 6,967,951 | B2 | | 11/2005 | Alfano |
| 7,072,342 | B1 | | 7/2006 | Elnathan |
| 7,085,274 | B1 | | 8/2006 | Rahim et al. |
| 7,120,149 | B2 | | 10/2006 | Salamat |
| 7,236,488 | B1 | | 6/2007 | Kavipurapu |
| 7,289,508 | B1 | * | 10/2007 | Greene ......................... 370/394 |
| 7,586,917 | B1 | | 9/2009 | Ferguson et al. |
| 7,912,069 | B2 | * | 3/2011 | Kramer et al. ........... 370/395.52 |
| 7,953,094 | B1 | | 5/2011 | Greene |
| 2001/0049729 | A1 | | 12/2001 | Carolan et al. |

(Continued)

OTHER PUBLICATIONS

Office Action from U.S. Appl. No. 12/511,856 dated Dec. 9, 2010, 11 pages.

(Continued)

*Primary Examiner* — Duc C Ho
(74) *Attorney, Agent, or Firm* — Harrity & Harrity, LLP (57) ABSTRACT

A data processing system performs any-to-any transmission of data blocks. The system receives the data blocks on incoming data streams, and load balances the data blocks across a number of processing paths. The processing paths process the data blocks causing one or more of the data blocks to become out of order relative to an order in which the data blocks were received. The system hashes the data blocks to determine a manner in which to transmit the data blocks, reorders the data blocks to restore the order in which the data blocks were received, and transmits the reordered data blocks on outgoing data streams.

19 Claims, 9 Drawing Sheets

U.S. PATENT DOCUMENTS

| | | |
|---|---|---|
| 2002/0075873 A1 | 6/2002 | Lindhorst-Ko et al. |
| 2002/0122424 A1 | 9/2002 | Kawarai et al. |
| 2002/0131414 A1 | 9/2002 | Hadzic |
| 2002/0147721 A1 | 10/2002 | Gupta et al. |
| 2002/0150043 A1 | 10/2002 | Perlman et al. |
| 2003/0012199 A1 | 1/2003 | Ornes et al. |
| 2003/0081600 A1 | 5/2003 | Blaker et al. |
| 2003/0095536 A1 | 5/2003 | Hu et al. |
| 2003/0099232 A1 | 5/2003 | Kudou et al. |
| 2003/0123447 A1 | 7/2003 | Smith |
| 2005/0018682 A1 | 1/2005 | Ferguson et al. |
| 2005/0025152 A1 | 2/2005 | Georgiou et al. |
| 2005/0089038 A1 | 4/2005 | Sugai et al. |

OTHER PUBLICATIONS

Co-pending U.S. Appl. No. 10/419,798, entitled "Systems and Methods for Distributed Data Forwarding", by Junying Yu et al., filed Apr. 22, 2003, 28 pages.

Co-pending U.S. Appl. No. 13/090,362, entitled "Systems and Methods for Order Preserving Data", by Spencer Greene, filed Apr. 20, 2011, 37 pages.

Co-pending U.S. Appl. No. 12/511,856, entitled "Systems and Methods for Re-Ordering Data in Distributed Data Forwarding", by Dennis Ferguson et al., filed Jul. 29, 2009, 38 pages.

Office Action from U.S. Appl. No. 10/419,798, dated Jan. 16, 2007, 22 pages.

Office Action from U.S. Appl. No. 10/419,798, dated May 29, 2007, 23 pages.

Office Action from U.S. Appl. No. 10/419,798, dated Jun. 20, 2011, 16 pages.

Office Action from U.S. Appl. No. 10/419,798, dated Nov. 9, 2007, 24 pages.

Office Action from U.S. Appl. No. 12/511,856, dated May 19, 2011, 8 pages.

Spencer Greene; U.S. Appl. No. 10/358,274, filed Feb. 5, 2003; Systems and Methods for Order Preserving Data; 37 pages.

Spencer Greene; U.S. Appl. No. 10/417,196, filed Apr. 17, 2003; Systems and Methods for Processing Any-To-Any Transmissions; 35 pages.

Office Action from U.S. Appl. No. 12/511,856, dated Aug. 16, 2011, 9 pages.

Office Action from U.S. Appl. No. 13/090,362, dated Aug. 4, 2011, 21 pages.

* cited by examiner

SYSTEMS AND METHODS FOR PROCESSING ANY-TO-ANY TRANSMISSIONS

RELATED APPLICATIONS

This application is a continuation of U.S. patent application Ser. No. 10/417,196, filed Apr. 17, 2003, which claims priority under 35 U.S.C. §119 based on U.S. Provisional Application No. 60/453,818, filed Mar. 12, 2003, the disclosures of which are incorporated herein by reference.

BACKGROUND OF THE INVENTION

1. Field of the Invention

The present invention relates generally to data transfer and, more particularly, to systems and methods for preserving the order of blocks of data processed by one or more processing paths in a data processing system.

2. Description of Related Art

In a data processing or communications system that must deliver high throughput in processing or communicating a stream of data, an existing point-to-point approach is to provide n independent processing paths and distribute sub-streams of the data down each of the n paths. After processing by each of the processing paths, the sub-streams are recombined to create an output stream. A problem that arises using this approach is that the different processing paths may have different delays. As a result, if a first block of data (e.g., a packet or cell) is sent down a first path at time $t_1$ and a second block of data is sent down a second path at time $t_2 > t_1$, the second block of data may nonetheless finish being processed before the first. Therefore, if nothing is done to correct for this differential delay, the recombined stream of data will be out-of-order relative to the input stream. Out-of-order blocks of data can be problematic in a number of data processing applications.

Out-of-order blocks of data are particularly difficult to prevent in an "any-to-any" situation, when there are R input streams connected to S output streams via n processing paths. In the any-to-any situation, blocks of data are distributed across the n processing paths prior to determining the output destination. The processing paths determine the appropriate output destination.

According to the any-to-any situation, different blocks of data from an input stream can be destined for different output streams. The blocks of data of each input stream are distributed across the processing paths and then concentrated back to the desired output stream, possibly resulting in out-of-order streams. Algorithms exist for restoring order to out-of-order streams at recombination time, based on attaching sequence numbers to consecutive blocks at the input, and sorting blocks to restore consecutive sequence numbers at the output. In the any-to-any situation, however, a given output will not receive all sequence numbers from a given input, making existing sorting algorithms impractical.

Therefore, there exists a need for systems and methods that preserve the order of blocks of data in data streams that have been distributed across one or more paths in a data processing system.

SUMMARY OF THE INVENTION

Systems and methods, consistent with the principles of the invention, address this and other needs by providing mechanisms for maintaining the order of data blocks transmitted in an any-to-any transmission on one or more processing paths. In particular, systems and methods, as described herein, maintain the order of packets on a particular output that come from a single input. It is unnecessary to maintain the relative order of packets from different inputs or across different outputs.

In accordance with the principles of the invention as embodied and broadly described herein, a data processing system performs any-to-any transmission of data blocks. The system receives the data blocks on incoming data streams and load balances the data blocks across a number of processing paths. The processing paths process the data blocks possibly causing one or more of the data blocks to become out of order relative to an order in which the data blocks were received. The system hashes the data blocks to determine a manner in which to transmit the data blocks, reorders the data blocks to restore the order in which the data blocks were received, and transmits the reordered data blocks on outgoing data streams.

In accordance with another aspect of the invention, a method for any-to-any transmission of data blocks in a data processing system is provided. The method includes receiving the data blocks on incoming data streams; load balancing the data blocks across multiple processing paths; and processing the data blocks by the processing paths, at least some of the processing possibly causing one or more of the data blocks to become out of order relative to an order in which the data blocks were received. The method further includes ordering the processed data blocks to restore the order in which the data blocks were received and transmitting the ordered data blocks on outgoing data streams.

In accordance with yet another aspect of the invention, a data processing system that includes input circuits, processing paths, and output circuits is provided. The input circuits are configured to receive data blocks and load balance the data blocks across multiple input links. The processing paths connect to the input links and are configured to process the data blocks, where at least some of the processing possibly causes one or more of the data blocks to become out of order relative to an order in which the data blocks were received by the input circuits. The output circuits are configured to restore the order of the data blocks to the order in which the data blocks were received by the input circuits and transmit the ordered data blocks.

In accordance with a further aspect of the invention, a network device that includes at least one input circuit, multiple processing paths, and at least one output circuit is provided. The at least one input circuit is configured to receive data blocks in a first order, where the data blocks belong to multiple data flows, and distribute the data blocks across one or more input links. The processing paths connect to the one or more input links and are configured to hash the data blocks and transmit, for each of the data flows, the data blocks to one of one or more output links based on the hashing. The at least one output circuit is configured to receive the data blocks from the processing paths in a second order, restore the data blocks to the first order, and transmit the restored data blocks.

In accordance with another aspect of the invention, a network device that includes input circuits, processing paths, and output circuits is provided. The input circuits are configured to receive data blocks in a first order and load balance the data blocks across multiple input links. The processing paths connect to the input links and are configured to hash the data blocks and transmit the data blocks to multiple output links based on the hashing. The output circuits are configured to receive the data blocks from the processing paths in a second order, restore the data blocks to the first order, and transmit the restored data blocks.

BRIEF DESCRIPTION OF THE DRAWINGS

The accompanying drawings, which are incorporated in and constitute a part of this specification, illustrate an embodiment of the invention and, together with the description, explain the invention. In the drawings.

DETAILED DESCRIPTION

The following detailed description of the invention refers to the accompanying drawings. The same reference numbers in different drawings may identify the same or similar elements. Also, the following detailed description does not limit the invention. Instead, the scope of the invention is defined by the appended claims and equivalents.

Systems and methods, consistent with the principles of the invention, provide mechanisms for preserving the order of data blocks transmitted in an any-to-any manner within a system, such as a network device or a series of network devices. For purposes of the discussion to follow, assume that data blocks arrive at R input circuits and are delivered to any of S output circuits based on information in the data blocks. A subset of the inputs may be bonded together to form a higher speed input link. Similarly, a subset of the outputs may be bonded together to form a higher speed output link.

A load balancing device selects on a block-by-block basis which of the inputs to use. The load balancing device performs its load balancing without knowledge of the destinations of the data blocks. A concentrator collects the blocks from the outputs and reorders them, if necessary, to form a single high speed output. No particular relationship is enforced between or among blocks that arrive on different inputs or blocks that exit on different outputs.

In a point-to-point transmission system, the destinations of the data blocks are known when the data blocks are received. Load balancing is typically performed in a point-to-point system with knowledge of the destinations of the data blocks. By contrast, in an any-to-any transmission system, the load balancing is performed without knowledge of the destinations of the data blocks.

Exemplary Order-Preserving Data Processing System

Figure 1:
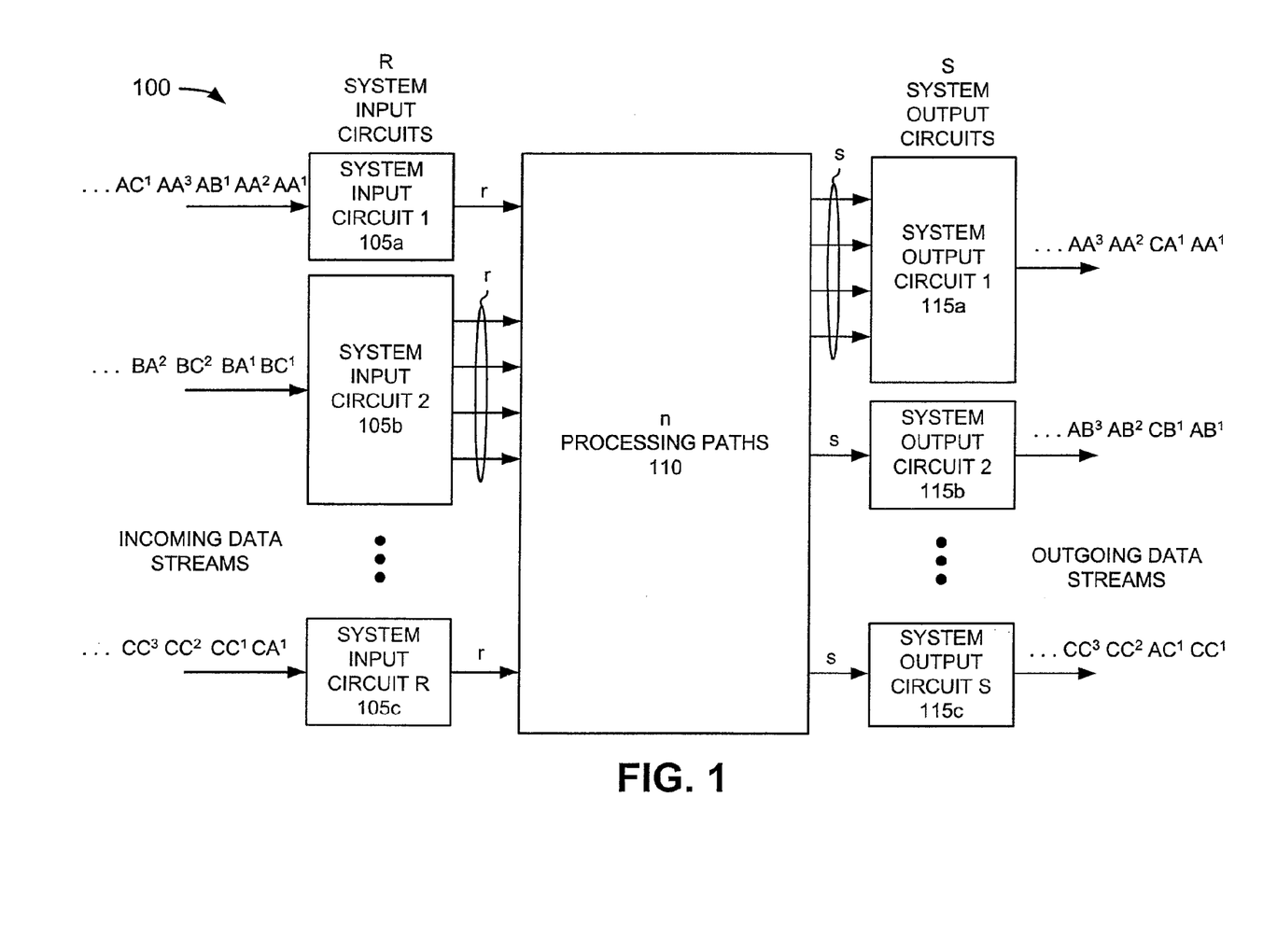
FIG. 1 is a diagram of an exemplary data processing system consistent with the principles of the invention.

FIG. 1 is a diagram of an exemplary data processing system 100 that restores the order of data blocks sent across multiple processing paths in a manner consistent with the principles of the invention. Data processing system 100 may include R system input circuits 105a-105c (collectively referred to as input circuits 105), n processing paths 110, and S system output circuits 115a-115c (collectively referred to as output circuits 115). Each input circuit 105 may include logic for receiving and processing one or more streams of data blocks. These data blocks may include, for example, packets, cells, fragments of packets or cells, or other types of encapsulated data. A data stream may include multiple blocks of data received at a single input circuit 105.

As shown in FIG. 1, each of input circuits 105a-105c receives an input stream and connects to processing paths 110 via r standard input link(s), where r>0 and may differ for the different input circuits. For example, input circuits 105a and 105c receive an input stream and connect to processing paths 110 via a single input link. Input circuit 105b, however, receives a high speed input stream and connects to processing paths 110 via multiple input links. In the example shown in FIG. 1, four input links are used together to form a high speed input link (or "superlink"). In other implementations consistent with the principles of the invention, more or fewer input links may form the high speed input link.

Input circuit 105a, for example, may receive data blocks $AA^1$, $AA^2$, $AB^1$, etc., where the letters signify a source, destination pair. $AA^1$ represents a first data block from input circuit 105a to output circuit 115a. $AA^2$ represents a second data block from input circuit 105a to output circuit 115a. $AB^1$ represents a first data block from input circuit 105a to output circuit 115b. The source, destination pairs are shown for purposes of illustration. Input circuit 105a may not know the particular destinations for received data blocks.

Processing paths 110 may include any number of devices that may independently process blocks of data received from any of input circuits 105. These devices may be connected in series and/or parallel and may include multiple processors, one or more switch fabrics, and/or multiple packet routers. Each of processing paths 110 may determine a destination for a received data block based on information contained in or appended to the data block. For example, a processing path 110 may analyze data block information, such as header information, to determine the appropriate one of output circuits 115 to receive the data block. A processing path 110 may also perform hashing functions on data blocks to identify particular output links associated with output circuits 115. Each of processing paths 110 may use a same hash function so that data blocks belonging to the same data flow may be directed to the same output link of one of output circuits 115.

Each output circuit 115 may include circuitry for re-ordering blocks of data, if necessary, received from the n processing paths 110 and outputting the re-ordered blocks of data as an outgoing data stream. In the any-to-any Situation consistent with the principles of the invention, every data block in the same data flow (i.e., from the same source to the same destination) should be kept in order. At each output circuit 115, the relative output of data blocks in different data flows (e.g., AA vs. BA vs. CA vs. DA) is not significant. All data blocks in the same data flow (i.e., from the same source to the same destination (e.g., all AA's or all BA's)), however, should be in numerical order relative to each other.

As shown in FIG. 1, each of output circuits 115a-115c receives data blocks on s output link(s) from processing paths 110, where s>0 and may differ for the different output circuits, and outputs data blocks on an output stream. For example, output circuits 115b and 115c receive data blocks on a single output link and output data on an output stream. Output circuit 115a, however, receives data blocks on multiple output links and outputs data blocks on a high speed output stream. In the example shown in FIG. 1, four output links are used together to form the high speed output link (or "superlink"). In other implementations consistent with the principles of the invention, more or fewer output links may form the high speed output link.

Exemplary System Input Circuit

Figure 2:
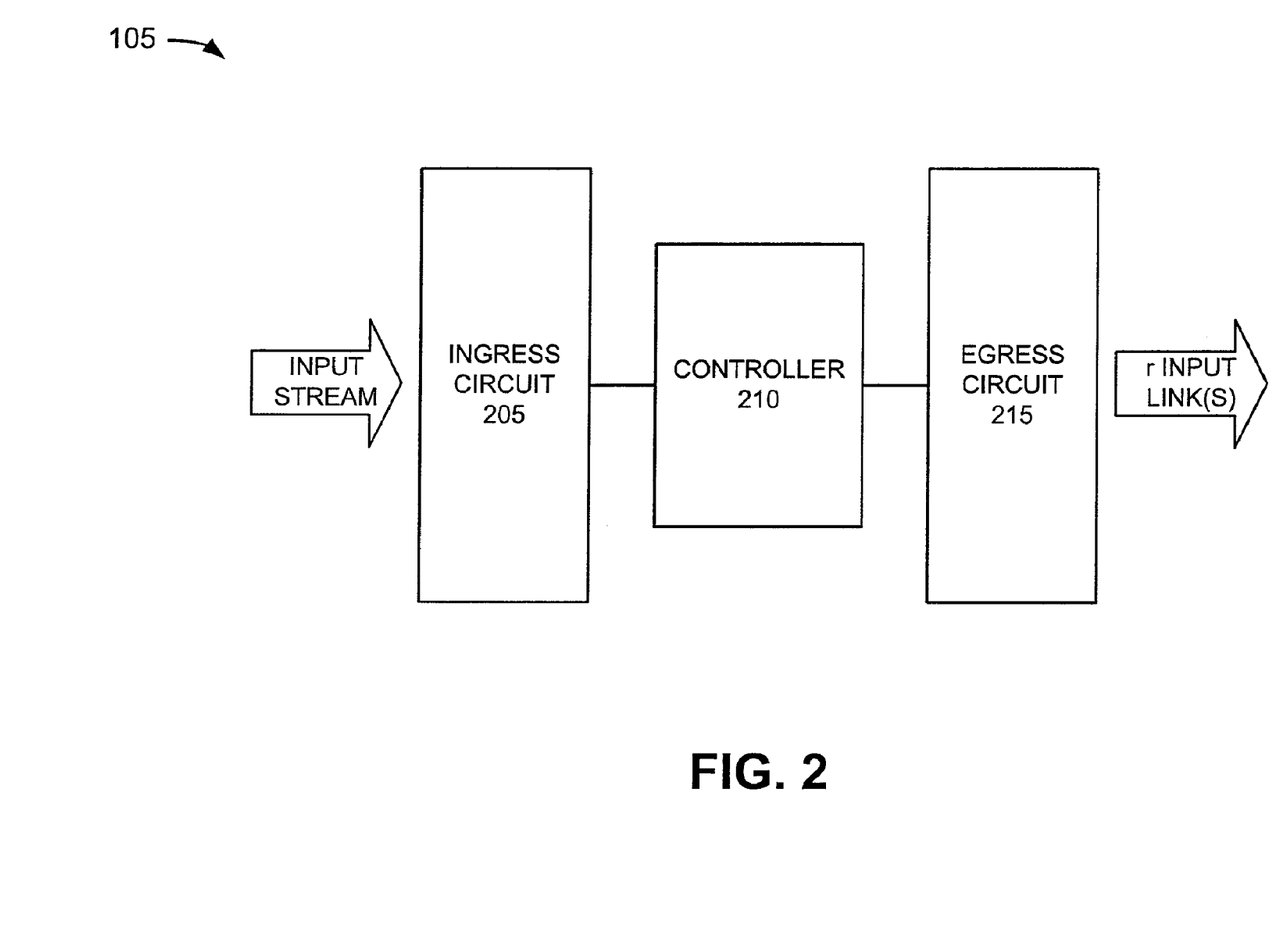
FIG. 2 is an exemplary diagram of a system input circuit consistent with the principles of the invention.

FIG. 2 illustrates exemplary components of a system input circuit 105, consistent with the principles of the invention. Input circuit 105 may include an ingress circuit 205, a controller 210, and an egress circuit 215. Ingress circuit 205 may include conventional circuitry for receiving and buffering an incoming data stream (e.g., a data stream including data blocks $AA^1$, $AA^2$, $AB^1$, etc.) and transferring the data blocks of the incoming data stream to controller 210.

Controller 210 may include a conventional processing device that may process the data blocks received at ingress circuit 205. For example, controller 210 may assign sequence and/or stream numbers to data blocks before sending them onward.

Egress circuit 215 may include conventional circuitry for receiving blocks of data from controller 210 and for transmitting the data blocks across the n processing paths 110 on the r input link(s). Egress circuit 215 may use conventional data load management schemes to balance the load transmitted on the r input link(s). For example, egress circuit 215 may use a conventional load-balancing scheme when determining on which of the r input link(s) to transmit a data block.

Exemplary System Output Circuit

System output circuit 115 preserves the order of data blocks received from processing paths 110. There are many ways to implement these functions. According to one implementation consistent with the principles of the invention, output circuit 115 resembles the output circuit described in related copending application, entitled "SYSTEMS AND METHODS FOR ORDER PRESERVING DATA," Ser. No. 10/358,274, filed Feb. 5, 2003. In other implementations, output circuit 115 may be configured differently.

Figure 3:
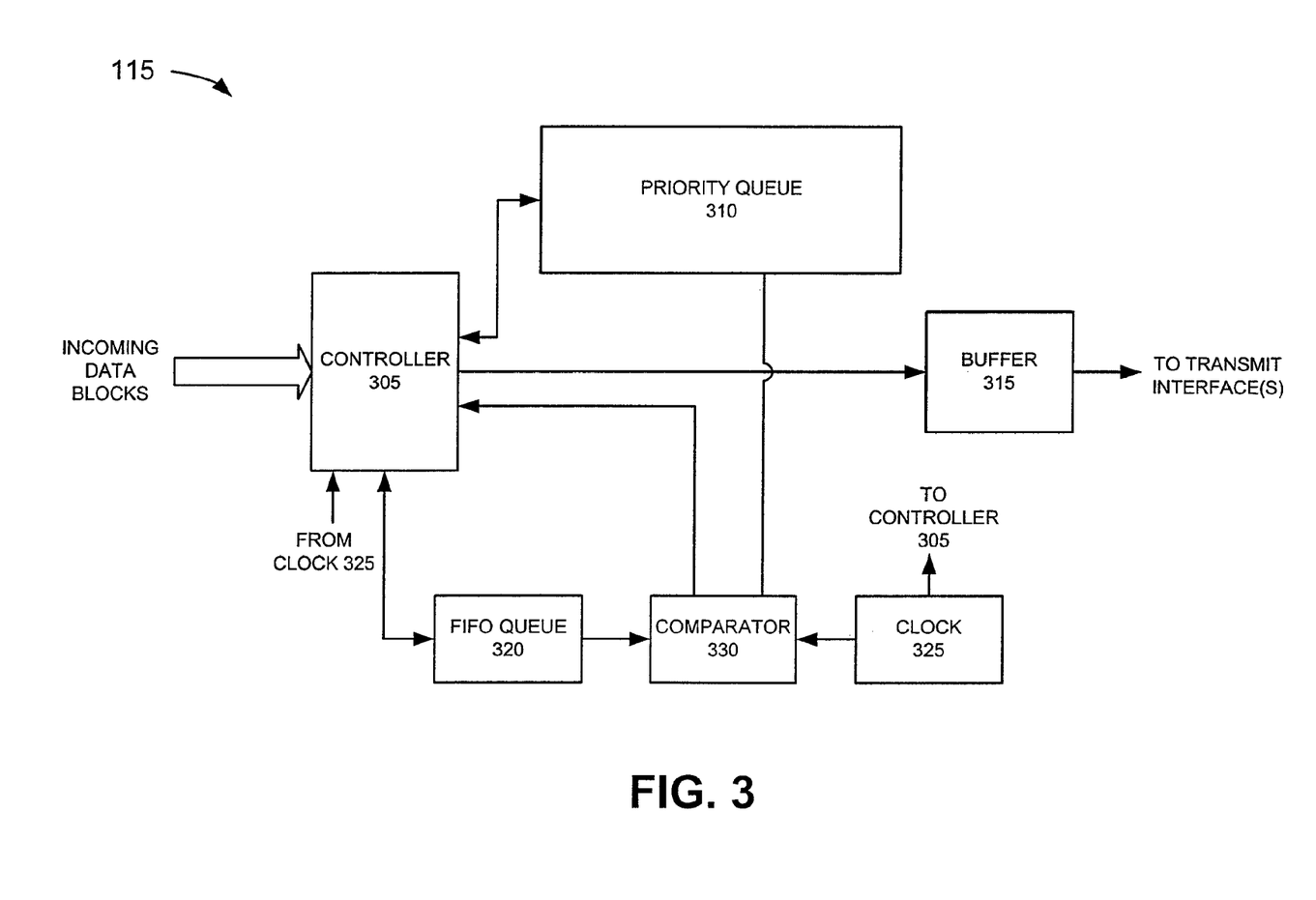
FIG. 3 is an exemplary diagram of a system output circuit consistent with the principles of the invention.

FIG. 3 illustrates exemplary components of an output circuit 115 consistent with the principles of the invention. Output circuit 115 may include a controller 305, a priority queue 310, a buffer 315, a First-In-First-Out (FIFO) queue 320, a clock 325, and a comparator 330. Controller 305 may include a conventional processing device and may process the blocks of data received at output circuit 115. Buffer 315 and FIFO queue 320 may reside in memory of one or more conventional memory devices. Such memory devices may include small-capacity storage devices, such as registers or Random Access Memory (RAM) circuits, or large-capacity storage devices, such as magnetic and/or optical recording mediums and their corresponding drives. Buffer 315 may store each block of data received by controller 305. FIFO queue 320 may store a stream number and a time stamp 2-tuple corresponding to each block of data received at controller 305.

Figure 4:
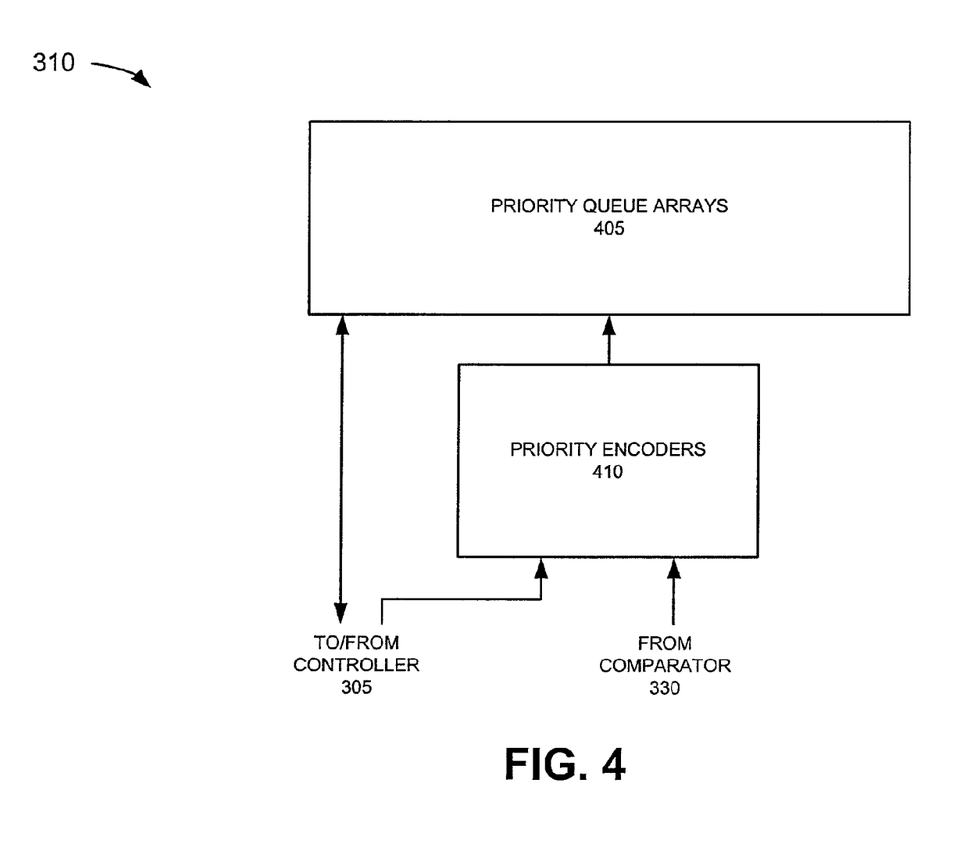
FIG. 4 is an exemplary diagram of the priority queue of FIG. 3 according to an implementation consistent with the principles of the invention.

As illustrated in FIG. 4, priority queue 310 may include priority queue arrays 405 and priority encoders 410. Priority queue arrays 405 may include R arrays (not shown), with each array corresponding to a specific input circuit 105. Each of the R arrays may store pointers to blocks of data in buffer 315 that were received from a corresponding input circuit 105. Priority encoders 410 may include R priority encoders, each associated with a single array of priority queue arrays 405. Each priority encoder may select a next sequence number, in a round-robin sense, for retrieving a pointer stored in a corresponding array of priority queue arrays 405.

Figure 5:
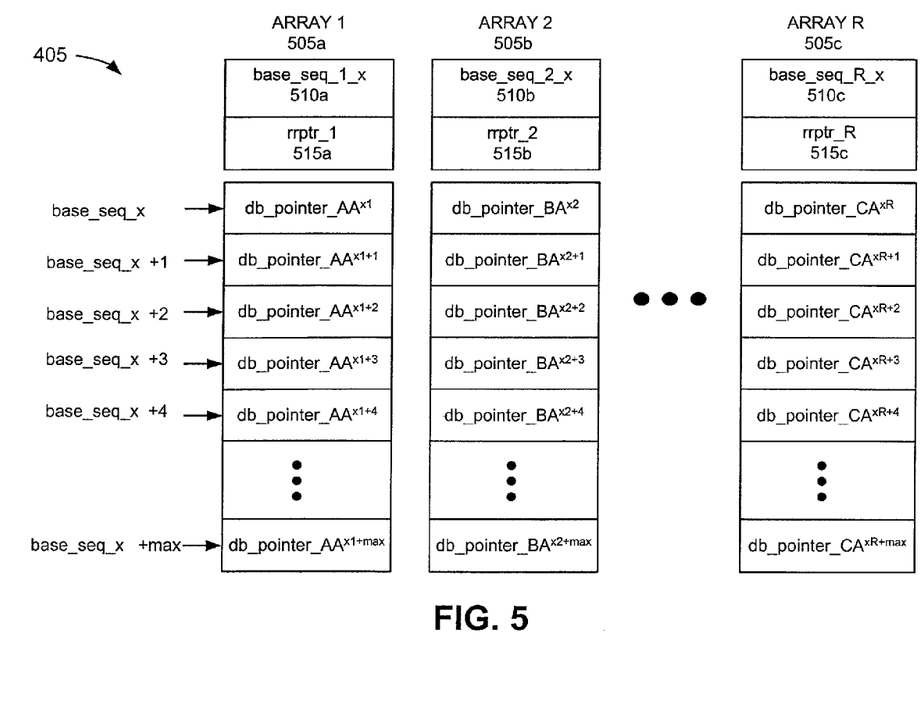
FIG. 5 is an exemplary diagram of the priority queue arrays of FIG. 4 according to an implementation consistent with the principles of the invention.

FIG. 5 illustrates an exemplary diagram of the R arrays of priority queue arrays 405. Each array 505 may be assigned to an incoming data stream received by an input circuit 105. For example, array 1 505a may be assigned to an incoming data stream received at input circuit 1 105a and array R 505c may be assigned to an incoming data stream received at input circuit R 105c. Each array may store data block pointers (db_pointer) to locations in buffer 315 where controller 305 stores fixed or variable-length data blocks for the incoming data stream assigned to an array. Each data block pointer can be stored in an array in a location corresponding to the sequence number that was received with the corresponding data block. For example, as shown in FIG. 5, pointers (db_pointer_$AA^x$, . . . , db_pointer_$A^{x+max}$) in array 1 505a are stored in sequential order according to corresponding data block sequence numbers (e.g., base_seq_x through base_seq_x+max).

Each array 505 may maintain a "window" of sequence numbers spanning the sequence numbers between a base sequence array entry 510 (base_seq_x) and a sequence number specified by a maximum value (max) added to the base sequence array entry 510 (base_seq_x+max). The data block pointers stored in array 505, thus, correspond to the sequence numbers from base_seq_x to base_seq_x+max. Each array 505 may additionally include a round robin pointer 515 (rrptr) that indicates a next candidate sequence number, as determined by a corresponding priority encoder of priority encoders 410 (FIG. 4), for selecting a data block pointer from the array with which a data block may be retrieved from buffer 315.

Returning to FIG. 3, clock 325 may include conventional circuitry for maintaining a current time $t_{current}$. Comparator 330 may include conventional circuitry for receiving the current time ($t_{current}$) from clock 325 and comparing the current time with a time stamp ($t_{timestamp}$) stored at the front of FIFO queue 320. If the comparison indicates that $t_{current}$ is greater than a sum of $t_{timestamp}$ and a value maxd, then comparator 330 may send a signal to a priority encoder of priority encoders 410 to select a next sequence number in a round robin fashion. The value maxd represents a known, or estimated, maximum differential delay between each of the n processing paths 110. Using an appropriate round robin pointer 515, controller 305 retrieves a data block pointer from a corresponding array 505. Controller 305 uses the retrieved data block pointer to further retrieve a data block from buffer 315 for subsequent transmission.

Exemplary FIFO Queue

Figure 6:
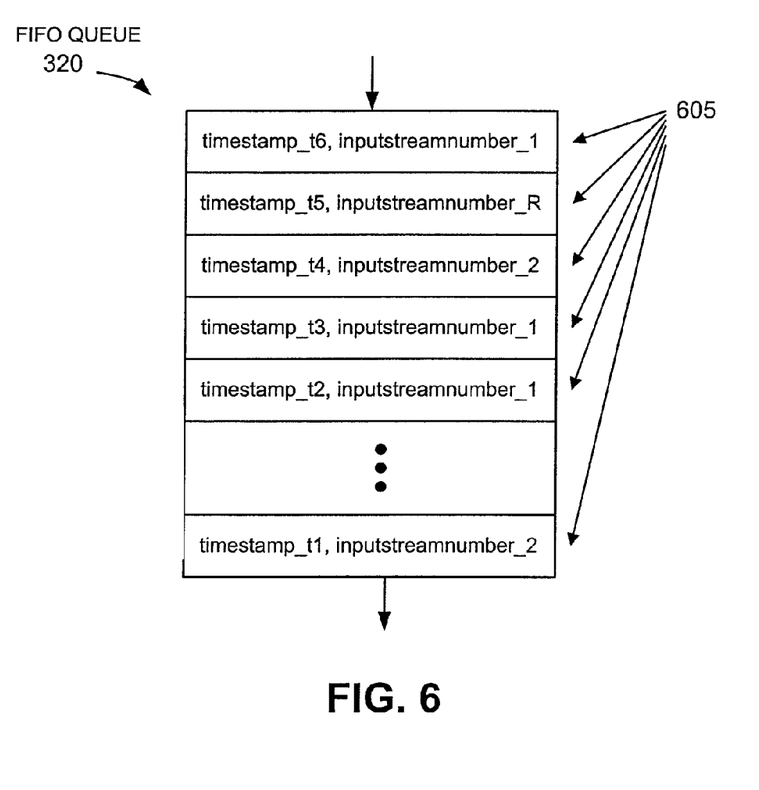
FIG. 6 is an exemplary diagram of the FIFO queue of FIG. 3 according to an implementation consistent with the principles of the invention.

FIG. 6 is an exemplary diagram of a FIFO queue 320. Each memory location in FIFO queue 320 may store a 2-tuple 605 containing an input stream number and time stamp ($t_{timestamp}$) corresponding to each block of data received at controller 305. The input stream number indicates a system stream identifier {1, 2, . . . , R} for a stream of data blocks received at an input circuit 105 corresponding to the system stream identifier. The time stamp indicates the time at which a data block of the data stream was received at an output circuit 115.

Exemplary Any-to-Any Processing

The operation of data processing system 100 may be described in terms of data blocks belonging to one or more data streams that are received by data processing system 100. Data processing system 100 may be designed to handle four types of transmissions: (A) a many-to-many transmission where data blocks are received at an input circuit 105 having multiple input links (e.g., input circuit 105b) and output by an output circuit 115 having multiple output links (e.g., output circuit 115a); (B) a many-to-one transmission where data blocks are received at an input circuit 105 having multiple input links (e.g., input circuit 105b) and output by an output circuit 115 having a single output link (e.g., output circuit 115b); (C) a one-to-many transmission where data blocks are received at an input circuit 105 having a single input link (e.g., input circuit 105a) and output by an output circuit 115 having multiple output links (e.g., output circuit 115a); and (D) a one-to-one transmission where data blocks are received at an input circuit 105 having a single input link (e.g., input circuit 105a) and output by an output circuit 115 having a single output link (e.g., output circuit 115b).

Figure 7:
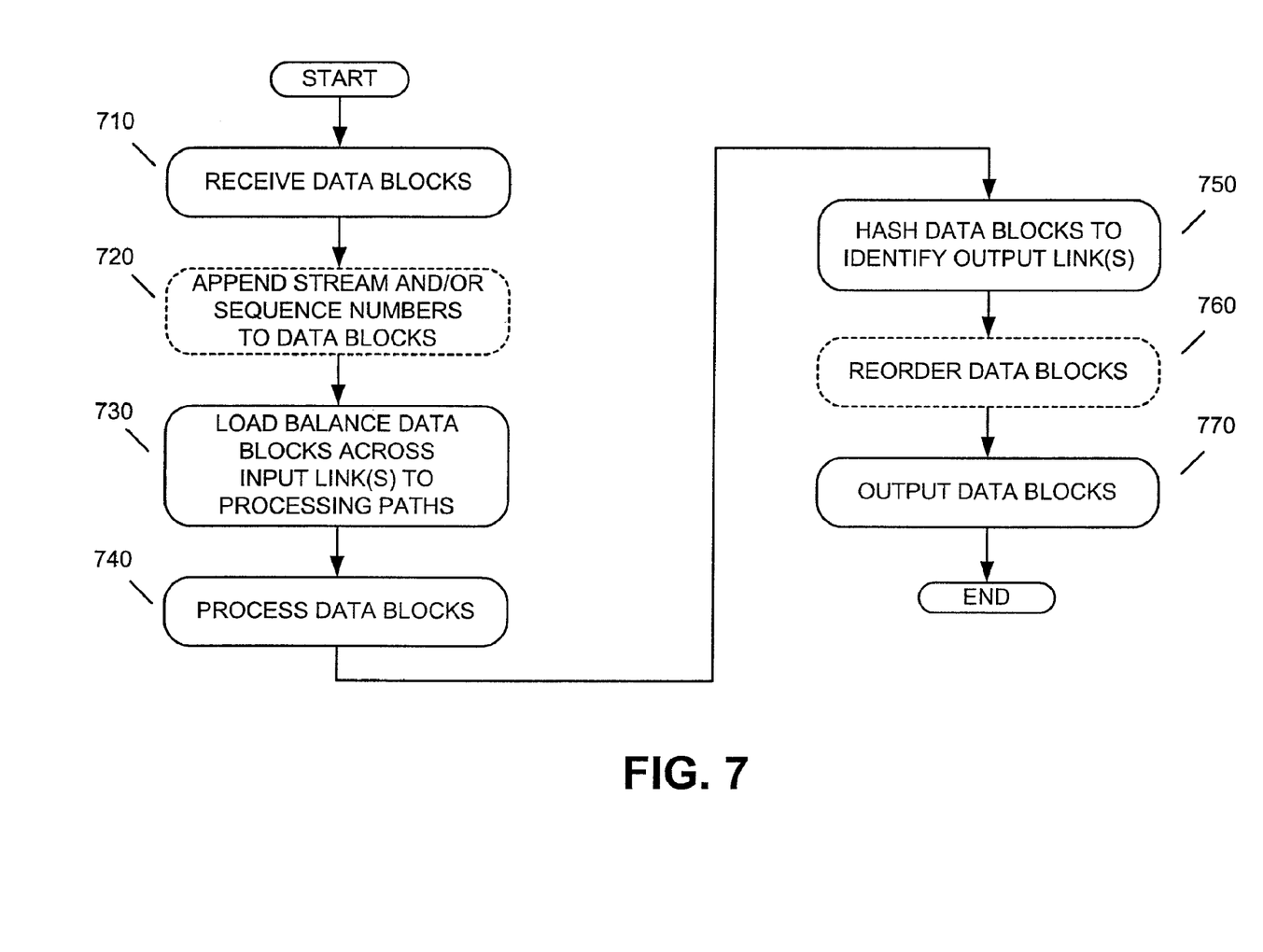
FIG. 7 is a flowchart of exemplary any-to-any processing according to an implementation consistent with the principles of the invention.

FIG. 7 is a flowchart of exemplary any-to-any processing according to an implementation consistent with the principles of the invention. Processing may begin with input circuits 105 receiving data blocks via input ports (act 710). The data blocks may belong to one or more data streams.

Input circuits 105 may optionally assign stream numbers and sequence numbers to the data blocks (act 720). The stream numbers may identify the data streams to which the data blocks belong. The sequence numbers may identify the data blocks' place within those data streams. A data block's place may be determined from information within the data block (e.g., from header information) or by the order in which the data block was received.

Input circuits 105 may use conventional load balancing techniques to send the data blocks on one or more input links to processing paths 110 (act 730). For example, in one implementation consistent with the principles of the invention, an input circuit 105 may use a round robin technique to assign the data blocks to the input links. Such a technique may balance the number of data blocks given to any particular input link.

In the case where an input circuit 105 includes a single input link to processing paths 110, such as input circuit 105a, input circuit 105 may not need to use a load balancing technique because all of the data blocks will be sent on the same input link. Alternatively, the load balancing technique may result in all of the data blocks being sent on the same (single) input link.

Processing paths 110 may process the data blocks as necessary (act 740). For example, processing paths 110 may perform route lookup, accounting, and/or quality of service functions associated with the data blocks. In other implementations, processing paths 110 may perform other types of data processing.

Processing paths 110 may also perform hashing functions associated with the data blocks to direct the data blocks to one or more output links (act 750). For example, a processing path 110 may hash information contained in or appended to a data block, such as data flow information, to identify an output link for the data flow. In this manner, processing paths 110 may send data blocks from the same data flow to the same output link.

In the case of a many-to-many transmission, a data block may take many different paths from the input to the output. For example, as shown in FIG. 1, input circuit 105b includes four input links and output circuit 115a includes four output links. A data block transmitted from input circuit 105b to output circuit 115a may be transmitted on one of sixteen different processing paths 110. Processing paths 110 may use a same hash function so that data blocks belonging to the same data flow will be directed to the same output link. Similar functions may be performed for a one-to-many transmission.

In the case of a one-to-one transmission or a many-to-one transmission, processing paths 110 may use a hash function that directs all data blocks to the same (single) output link. In an alternate implementation, processing paths 110 may use mechanisms for determining that the transmission is a one-to-one or many-to-one transmission and use alternative techniques for identifying the output link for the data blocks.

Processing paths 110 may transmit the data blocks of a particular data flow to the same output link. Due to different processing times associated with the different processing paths 110, the data blocks at any one of the output links may be out of order. For example, the data blocks $C^1$, $C^2$, and $C^3$ may arrive at an output link in the order $C^2$, $C^1$, and $C^3$.

Output circuits 115 may receive data blocks from processing paths 110 and place them in the correct order, if necessary (act 760). Reordering of data blocks (as described below) may be used in the case of many-to-many and many-to-one transmissions. Reordering of data blocks may be unnecessary in the case of one-to-one and one-to-many transmissions because the data blocks may not become out of order during processing by processing paths 110. Output circuits 115 may then transmit the data blocks, in the correct order, via an output port (act 770).

Figure 8:
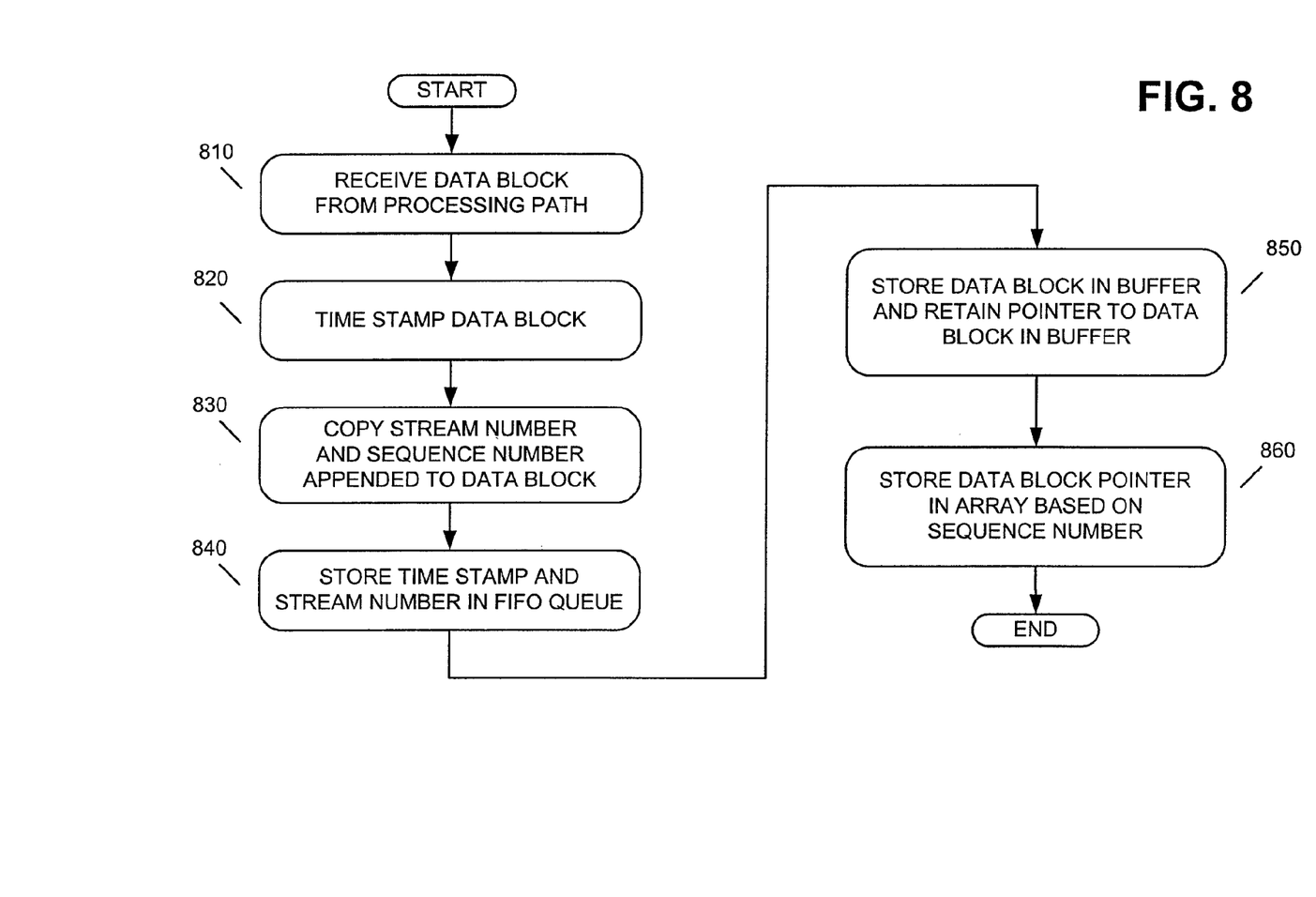
FIGS. 8 and 9 are exemplary flowcharts of processing for preserving the order of blocks of data according to an implementation consistent with the principles of the invention.
Figure 9:
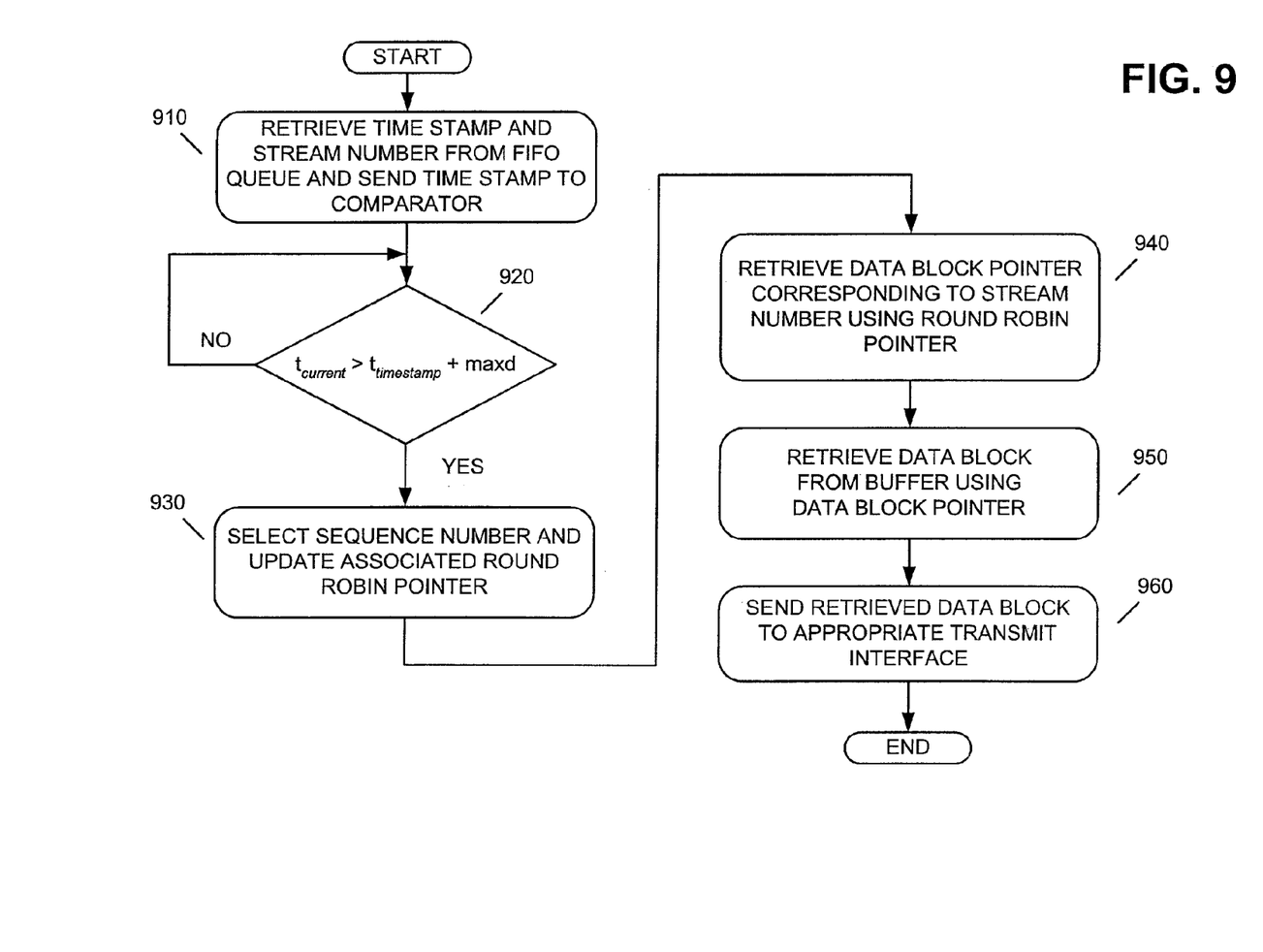

FIGS. 8 and 9 are exemplary flowcharts of processing, by an output circuit 115, for restoring the order of blocks of data processed by processing paths 110 according to an implementation consistent with the principles of the invention. The exemplary processing of FIGS. 8-9 may be implemented at each system output circuit 115 of system 100. The activity of FIG. 9 may be asynchronous to the activity of FIG. 8, such that the activity of FIG. 9 may regularly occur when FIFO queue 320 is non-empty.

As shown in FIG. 8, to begin processing, controller 305 may receive a data block from a processing path of processing paths 110 (act 810). Controller 305 may retrieve a current time from clock 325 and time stamp $t_{timestamp}$ the received data block (act 820). Controller 305 may further copy the input stream number (e.g., inputstreamnumber_i) and sequence number (e.g., seq_no_y) possibly appended to each data block by an input circuit 105 (act 830). Controller 305 may store the copied time stamp and input stream number as a 2-tuple 605 in its FIFO queue 320 in the order that the associated data block was received (act 840).

Controller 305 may then store the received data block in buffer 315 and retain a data block pointer locating this block of data within buffer 315 (act 850). Controller 305 may further store the retained data block pointer in the array corresponding to the data block's input stream number, in an array 505 entry corresponding to the data block's sequence number (act 860).

As shown in FIG. 9, controller 305 may retrieve the next time stamp ($t_{timestamp}$) and stream number 2-tuple 605 from FIFO queue 320 and may send the time stamp to comparator 330 (act 910). Comparator 330 may compare a current time $t_{current}$, received from clock 325, with the received time stamp $t_{timestamp}$ to determine if $t_{current}$ is greater than the sum of $t_{timestamp}$ and maxd (act 920):

$$t_{current} > t_{timestamp} + \text{maxd}.$$

If $t_{current}$ is greater than the sum of $t_{timestamp}$ and maxd, then comparator 330 signals an appropriate priority encoder of priority encoders 410 to select the next sequence number in its corresponding array 505 in a round-robin sense and update its associated round robin pointer 515 with the selected sequence number (act 930). For example, the appropriate priority encoder 410 may select sequence numbers in the following round-robin sequence: {SEQ. NO. x, SEQ. NO. x+1, . . . , SEQ. NO. x+K−1}.

Controller 305 may then retrieve the data block pointer from array 505, corresponding to the retrieved stream number, from the array entry sequence number equaling the round robin pointer (act 940). For example, if 2-tuple 605 retrieved from FIFO queue 320 contains inputstreamnumber_1 and priority encoder 410 selects a sequence number equaling the base sequence number plus a value, such as 3 (base_seq_x+3), then controller 305 retrieves data block pointer db_pointer_$AA^{x+3}$ from array 1 505a. Controller 305 then may retrieve a data block from buffer 315 using the data block pointer retrieved from the selected array 505 (act 950). Controller 820 may then send the retrieved data block to the transmit interface(s) (not shown) for transmission on an outgoing data stream (act 960).

CONCLUSION

In summary, systems and methods consistent with the principles of the invention assure that data blocks are transmitted in the same order in which the data blocks were received. In the case of a many-to-many transmission, data processing system 100 may apply load balancing functions to the assignment of data blocks to the input links, hashing functions to the data blocks to direct data blocks belonging to the same data flows to the same output links, and reordering functions on the data blocks from the output links In the case of a many-to-one transmission, data processing system 100 may apply load balancing functions to the assignment of data blocks to the input links and reordering functions on the data blocks on the output links. In the case of a one-to-many transmission, data processing system 100 may apply hashing functions to the data blocks to direct data blocks belonging to the same data flows to the same output links. In the case of a one-to-one transmission, data processing system 100 need not apply any load balancing, hashing, or reordering functions because all data blocks will remain in order.

The foregoing description of preferred embodiments of the present invention provides illustration and description, but is not intended to be exhaustive or to limit the invention to the precise form disclosed. Modifications and variations are possible in light of the above teachings or may be acquired from practice of the invention. For example, while series of acts have been described with regard to FIGS. 7-9, the order of the acts may differ in other implementations consistent with the principles of the invention. Further, non-dependent acts may be performed in parallel.

No element, act, or instruction used in the description of the present application should be construed as critical or essential to the invention unless explicitly described as such. Also, as used herein, the article "a" is intended to include one or more items. Where only one item is intended, the term "one" or similar language is used. The scope of the invention is defined by the claims and their equivalents.

What is claimed is:

1. A method for any-to-any transmission of data blocks in a data processing system, comprising:
    receiving, at the data processing system, a plurality of data blocks associated with an incoming data stream;
    assigning the data blocks to a plurality of input links using a load balancing technique to balance a quantity of data blocks assigned to each of the plurality of input links;
    sending the data blocks to a plurality of processing paths via the plurality of input links;
    independently processing the data blocks by the plurality of processing paths;
    outputting the processed data blocks from the plurality of processing paths in an order different from an order in which the data blocks were received;
    restoring the order of the processed data blocks to the order in which the data blocks were received at the data processing system; and
    transmitting the ordered data blocks on an outgoing data stream.

2. The method of claim 1, where the plurality of processing paths comprise at least one of a plurality of routers, a plurality of processors, or one or more switch fabrics.

3. The method of claim 1, further comprising:
    assigning a stream number to the data blocks, where the stream number identifies the incoming data stream.

4. The method of claim 3, further comprising:
    assigning a sequence number to each of the data blocks, where the sequence number for one of the data blocks identifies a relative order in which the one of the data blocks was received with regard to other ones of the data blocks within the incoming data stream.

5. The method of claim 4, where restoring the order of the processed data blocks includes:
    using the stream number and the sequence numbers to reorder the processed data blocks.

6. The method of claim 1, further comprising:
    assigning a sequence number to each of the data blocks, where the sequence number for one of the data blocks identifies a relative order in which the one of the data blocks was received with regard to other ones of the data blocks within the incoming data stream.

7. The method of claim 6, where restoring the order of the processed data blocks includes:
    using the sequence numbers to reorder the processed data blocks.

8. The method of claim 1, where the plurality of processing paths are connected to the plurality of input links and a plurality of output links; and
    where the data blocks are transmitted in a many-to-many fashion between multiple ones of the plurality of input links and multiple ones of the plurality of output links.

9. A data processing system, comprising:
    a plurality of input circuits, one input circuit, of the plurality of input circuits, connecting to an input stream and a plurality of input links, where the one input circuit is to:
        receive a plurality of data blocks on the input stream in a first order,
        assign the data blocks to the plurality of input links based on a load balancing scheme to balance a quantity of the data blocks assigned to each of the plurality of input links, and
        send the data blocks to the plurality of input links to which the data blocks were assigned;
    a plurality of processing paths, connected to the plurality of input links, to:
        independently process the data blocks,
        output the data blocks in a second order that differs from the first order; and
    a plurality of output circuits connected to the plurality of processing paths, where one output circuit, of the plurality of output circuits, is to:
        receive the data blocks in the second order,
        reorder the data blocks from the second order to the first order, and transmit the reordered data blocks from the one output circuit.

10. The system of claim 9, where the plurality of processing paths comprise at least one of a plurality of routers, a plurality of processors, or one or more switch fabrics.

11. The system of claim 9, where the one input circuit is further to assign a stream number to the data blocks, where the stream number identifies the input stream.

12. The system of claim 11, where the one input circuit is further to assign sequence numbers to the data blocks, where the sequence number for one of the data blocks identifies a relative order in which the one of the data blocks was received with regard to other ones of the data blocks within the input stream.

13. The system of claim 12, where the one output circuit is to use the stream number and the sequence numbers to reorder the data blocks.

14. The system of claim 9, where the one input circuit is further to assign sequence numbers to the data blocks, where the sequence number for one of the data blocks identifies a relative order in which the one of the data blocks was received with regard to other ones of the data blocks within the input stream.

15. The system of claim 14, where the one output circuit is to use the sequence numbers to reorder the data blocks.

16. The system of claim 9, where the plurality of processing paths receive the data blocks on the plurality of input links and output the data blocks on a plurality of output links; and
where the data blocks are transmitted in a many-to-many fashion between multiple ones of the plurality of input links and multiple ones of the plurality of output links.

17. A network device, comprising:
at least one input circuit to:
receive a plurality of data blocks in a first order,
assign sequence numbers to the data blocks, the sequence numbers identifying a relative order of the data blocks within the first order, and
output the data blocks to one or more input links, where when outputting the data blocks to the one or more input links, the at least one input circuit is to distribute the data blocks across the one or more input links using a load balancing technique;
a plurality of processing paths, connected to the one or more input links and one or more output links, to:
receive the data blocks via the one or more input links, process the data blocks, and output the data blocks to the one or more output links; and
at least one output circuit to:
receive, via the one or more output links, the data blocks from the processing paths in a second order that differs from the first order,
restore the data blocks to the first order using the sequence numbers, and
transmit the data blocks in the first order.

18. The network device of claim 17, where the one or more input links include a plurality of input links at least some of which are bundled together to form a high speed input link.

19. The network device of claim 17, where the one or more output links include a plurality of output links at least some of which are bundled together to form a high speed output link.

* * * * *